April 18, 1961 L. M. SHUH 2,979,939
LEAK DETECTION DEVICE
Filed Nov. 3, 1958 2 Sheets-Sheet 1
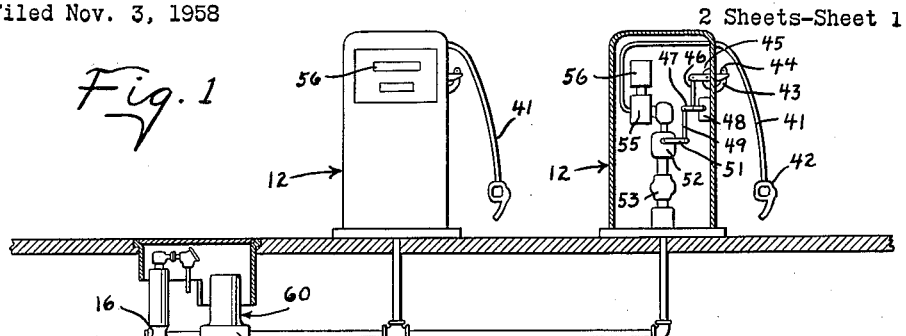
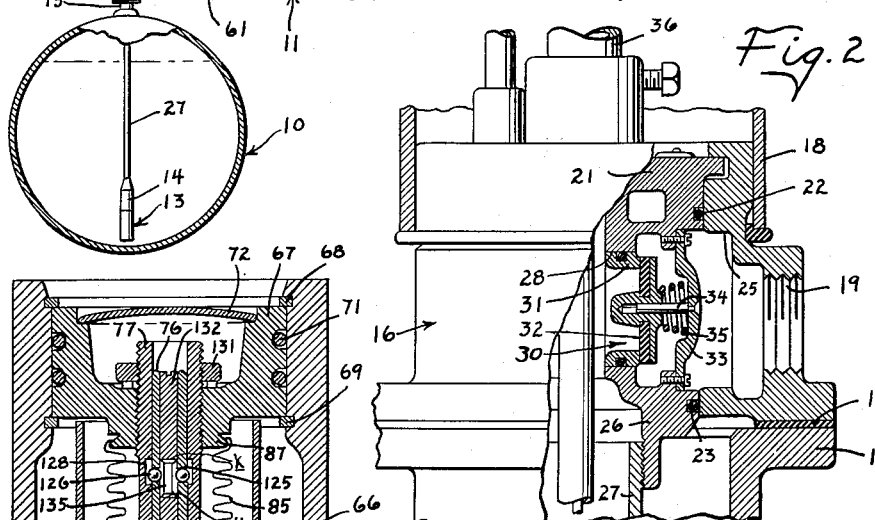
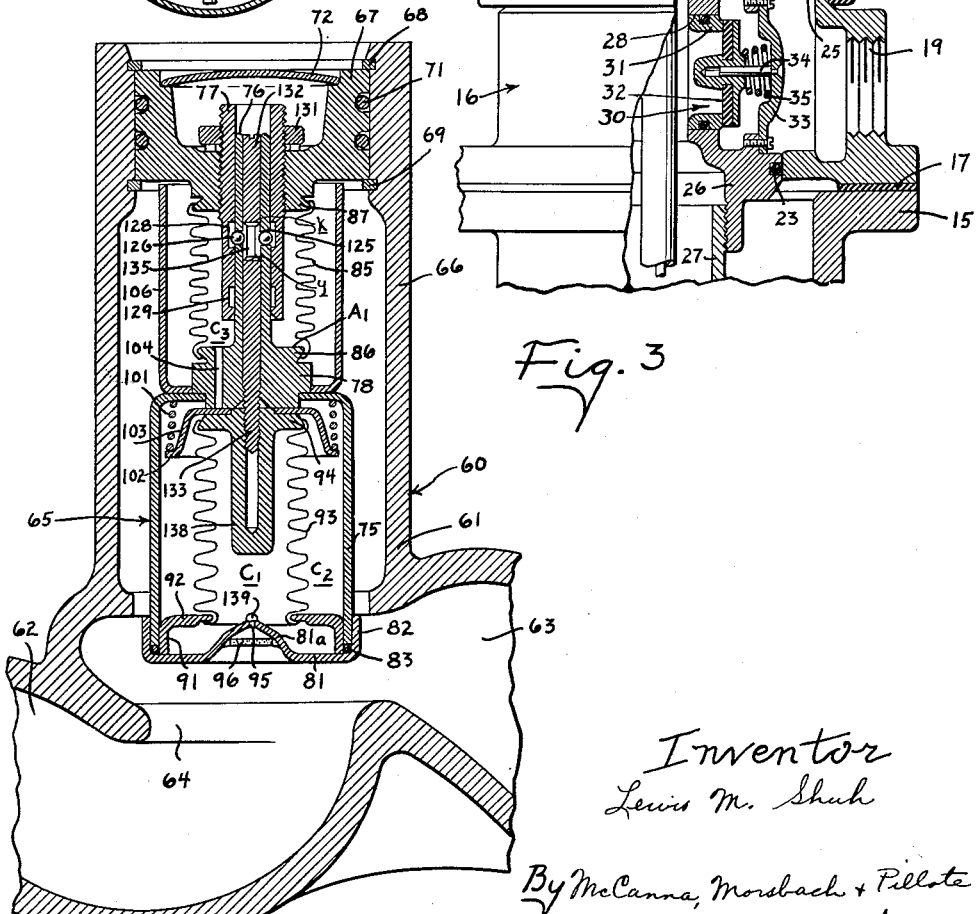
Inventor
Lewis M. Shuh
By McCanna, Morsbach & Pillote
Atty's

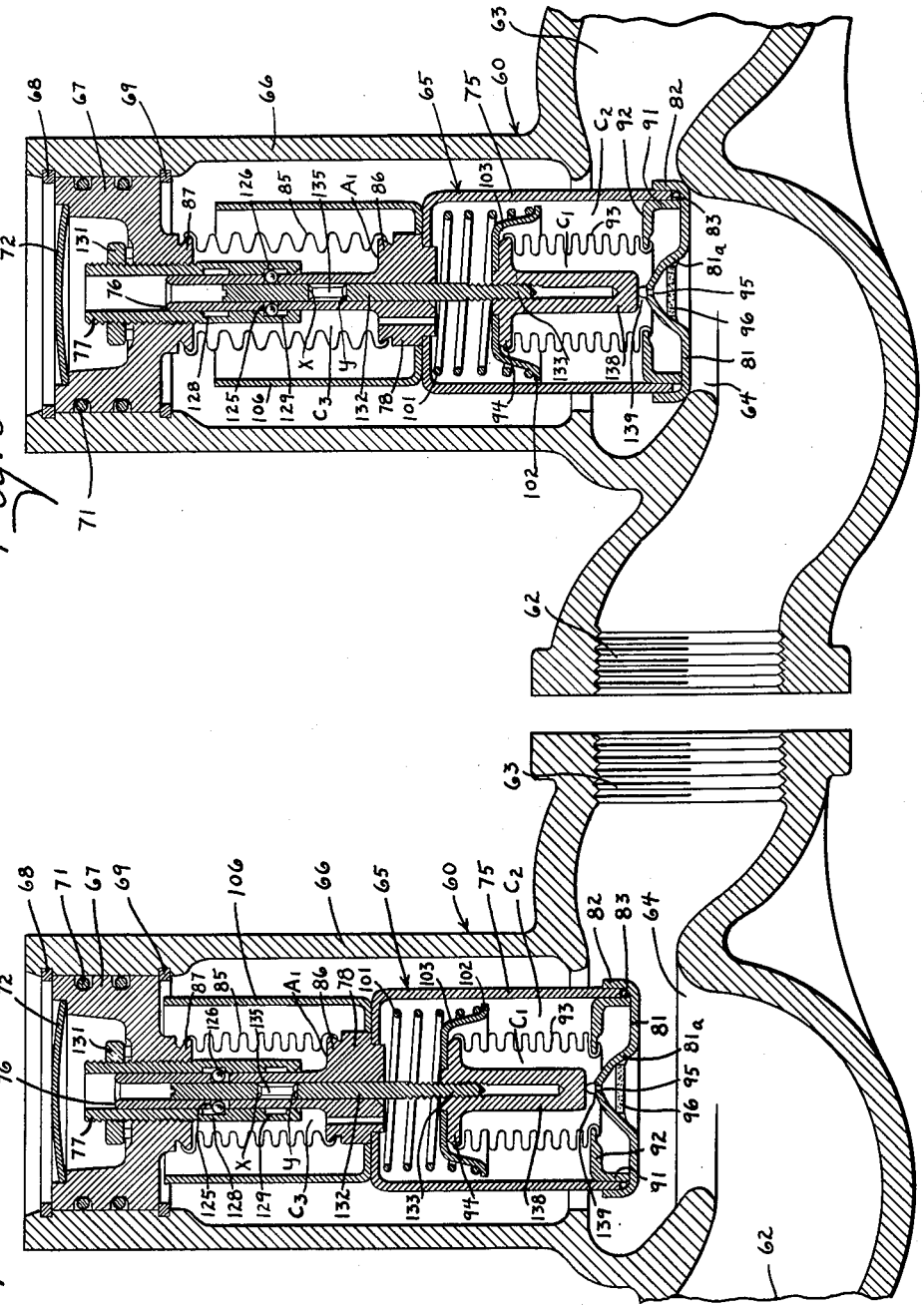

United States Patent Office 2,979,939
Patented Apr. 18, 1961

2,979,939

LEAK DETECTION DEVICE

Lewis M. Shuh, Davenport, Iowa, assignor to Red Jacket Manufacturing Co., Davenport, Iowa, a corporation of Iowa Filed Nov. 3, 1958, Ser. No. 771,661

15 Claims. (Cl. 73—40)

This invention relates to a leak detecting apparatus and particularly to an apparatus for detecting a leak in a line through which liquid is intermittently pumped.

In some gasoline service station installations the pump is located at the tank and delivers gasoline under pressure through a supply line to one or more remote pedestals. Since the gasoline in the supply line is under pressure, it is necessary to detect even relatively small leaks from the supply line in order to prevent a dangerous accumulation of gasoline in the ground around the leak in the line. In order to detect a leak in the line, it has heretofore been proposed to isolate the line from the remainder of the system by suitable valves in the line which close when the pump is stopped. The valves in the line will maintain the pressure therein subject to thermal expansion and contraction of the liquid and also subject to leaks in the line. It has also been determined that the rate of change of volume and pressure in the line, due to thermal contraction, is relatively low as compared to the rate of change of pressure and volume when a leak exists in the line. The present invention relates to an improved apparatus for detecting a leak in the line, as contrasted to thermal expansion and contraction of the liquid in the line, by detecting when the rate of decrease of pressure in the line exceeds a preselected rate.

An important object of this invention is to provide a mechanical apparatus for detecting when the rate of volume and pressure change in the line exceeds a preselected rate and for automatically interrupting the flow of liquid through the line.

Another object of this invention is to provide a leak detecting apparatus including a valve for controlling the flow through a line and having means for locking the valve in its open position if the change of pressure and volume of liquid in the line is below a preselected rate and for locking the valve in its closed position if the change in pressure and volume of liquid in the line is above a preselected rate indicative of a leak in the line.

A more particular object of this invention is to provide apparatus for detecting a leak in a line including a pressure responsive valve for controlling flow through the line and arranged to be held open so long as the pressure in the line exceeds a preselected value, and a chamber communicating with the line to receive a charge of liquid therefrom when the pump is operated and to deliver a restricted flow of liquid to the line when the pump is stopped, which flow is sufficient to maintain the preselected pressure in the line and prevent closing of the valve when the change in pressure and volume in the line is due only to thermal contraction but is insufficient to maintain the pressure in the line in the presence of a leak therein.

Still another object of this invention is to provide a novel arrangement for the measuring chamber and valve locking means by which the measuring chamber is disposed within the flow control valve and is movable therewith.

These, together with various ancillary objects and advantages of this invention will be more readily appreciated as the same becomes better understood by reference to the following detailed description when taken in connection with the accompanying drawings wherein:

Figure 1 is a diagrammatic view of a service station installation having the leak detecting apparatus of the present invention applied thereto;

Fig. 2 is an enlarged view of the discharge unit with parts broken away and shown in section to illustrate details of construction;

Fig. 3 is a fragmentary enlarged vertical sectional view through the leak detecting apparatus and illustrating the parts in their position during dispensing of liquid through the supply line;

Fig. 4 is a vertical sectional view through the leak detecting device and illustrating the valve member latched in its open position; and Fig. 5 is a vertical sectional view through the leak detecting device and illustrating the valve member latched in its closed position.

As previously described, the present invention is adapted for detecting leaks in a supply line through which liquid is intermittently pumped and is herein shown applied to a gasoline service station installation. Such an installation is diagrammatically shown in Figure 1 and includes an underground tank 10 for storing a quantity of gasoline, a supply line 11 for delivering gasoline from the tank to one or more pedestals 12, and a pump and motor 13, 14, herein shown of the submersible type, located at the tank for pumping gasoline therefrom through the supply line to the pedestals. The outlet of the pump may be connected to the supply line in any desired manner. One suitable arrangement is illustrated and includes a flanged fitting 15 on the upper end of the tank, a discharge head 16 mounted on the fitting and sealed thereto by a gasket 17, and an extension 18 attached to the discharge head and extending upwardly therefrom. The discharge head 16 has a lateral outlet 19 connected to the supply line 11. An adapter unit or thimble 21 is disposed in the discharge head and sealed thereto at spaced points by O-rings 22 and 23 to define an annular chamber 25 therebetween. The adapter unit has a downwardly facing opening 26 which is connected to the delivery pipe 27 leading from the pump 13, and a lateral passage 28 is formed in the adapter unit to permit liquid to flow from the downwardly facing opening to the annular chamber 25 in the discharge head. A check valve 30 is provided for controlling the flow of liquid to the supply line and includes a member 31 defining an annular valve seat and a valve member 32 cooperable with the seat. The valve member 32 is mounted by a spider 33 and a pin 34 on the adapter unit and is yieldably urged by a spring 35 to a position blocking flow through the port 28. As is apparent, the valve member 32 is arranged to open and permit flow from the delivery pipe 27 through the port 28 and chamber 25 to the supply line 11, and to close to prevent return flow. As is conventional, a drop pipe 36 is connected to the adapter unit to permit withdrawal of the adapter unit, the pump and motor assembly from the tank. The power for the motor is supplied through conductors which extend through the adapter unit downwardly into the tank.

A valve mechanism is also provided at the pedestal 12 and so arranged as to be closed when the pump is stopped to thereby entrap the liquid in the supply line 11 between the check valve 30 and the valve mechanism at the pedestal. As shown herein, the supply line 11 at each of the pedestals is connected to a delivery hose 41 having a conventional normally closed discharge valve 42 on the outlet end thereof, which discharge valve is manually operable to its open position to permit dispensing of gasoline. The pedestal 12 also includes a conventional nozzle support 43 and a switch lever 44 which is pivotally mounted by a bracket 45 on the pedestal. The switch lever is connected through a link 48 to the operating lever 47 of the pump control switch 48 and is also connected through a link 49 to the operating lever 51 of an interlock valve 52. The interlock valve is disposed in the supply line leading to the hose 41 and is normally closed, the interlock valve being opened in response to movement of the switch lever 44 to a position to close the pump control switch 48. A check valve 53 is also commonly provided in the supply line, either before or after the interlock valve, and a meter 55 controlling the register 56 is provided in the supply line for measuring the quantity of liquid passing therethrough.

When the pump 13 is stopped, the manually operable discharge valve 42, the interlock valve 52 and the check valve 53 at each pedestal are closed. In addition, the check valve 30 adjacent the tank also closes so as to thereby entrap the liquid in the supply line 11 between the check valve 30 at the tank and the valve 53 at the pedestal. In accordance with the present invention, provision is made for detecting a leak in the supply line between the valve 32 at the tank and the valve 53 at the pedestals. As shown in Fig. 1, the leak detector 60 is preferably located in the supply line 11 ahead of the connection of the pedestals 12 thereto so that a single detector is arranged to control flow to each of the pedestals. Alternatively, separate detectors may be provided at each pedestal, if desired for convenience of installation.

The leak detector 60 includes a casing 61 having an inlet 62 and an outlet 63 adapted for connection in the supply line 11 as shown in Fig. 1 so that, when the pump 13 is operated, gasoline passes through the casing from the inlet 62 to the outlet 63. A port 64 is formed intermediate the inlet and the outlet and a flow control valve member 65 is provided for controlling flow through the port 64. The casing 61 also includes an extension 66 which extends upwardly therefrom. A support member 67 is disposed in the upper end of the extension between split rings 68 and 69 and is sealed to the extension by O-rings 71. A dome shaped cap 72 is pressed into the member 67 to close the same.

The flow control valve member 65 comprises an inverted generally cup shaped member 75 having a valve stem 76 attached to the upper end thereof and slidably supported in a sleeve 77 carried by the member 67. As shown herein, the stem 76 has an enlarged integral lower end portion 78 at the lower end thereof, which lower end portion is secured to the cup shaped member 75 as by welding, in sealed relation thereto. A cover 81 having a flange 82 overlies the lower end of the cup shaped member 75 and is secured thereto as by welding or soldering generally indicated at 83. As will be noted, the cover 81 defines the valve face which cooperates with the port 64 to control flow therethrough.

The valve member 65 is pressure operated to its open position and for this purpose an area designated A1 at the upper end of the valve member is sealed from the remaining area at the upper end of the valve member so that the fluid pressure in the line is not applied to area A1. The surface of the valve member 65, except for area A1, is exposed to the fluid pressure in the line and the area A1 is exposed to a pressure different from that in the line. Consequently, when the line pressure exceeds the pressure on area A1, there will be a pressure unbalance on the valve member in a direction urging the same to its open position. As shown herein, the area A1 is sealed from the remaining area on the upper end of the valve member by a bellows 85 having the lower end spun over a flange 86 on the enlarged portion 78 of the stem and the upper end spun over a flange 87 on the member 67. The bellows seals the area A1 while permitting axial movement of the valve member toward and away from the port 64.

An expansible and contractible chamber is provided for receiving a charge of liquid from the line, when the pump 13 is operated to deliver liquid therethrough, and for returning the liquid to the line when the pump is stopped. This chamber is advantageously mounted within the cup shaped valve member 65. In particular, a ring 91 having an inwardly extending flange 92 is disposed within the cup shaped member and abuts against the cover 81. A bellows 93 has the lower end thereof spun over the flange 92 on the ring member and the upper end of the bellows 93 is spun over the rigid disk 94 defining the top wall of the chamber. A restricted passage 95 is formed in the cover 81 to communicate the expansible chamber C1, defined by the bellows 93 and the disk 94, with the line 11. The cover is preferably dished inwardly around the passage 95, as indicated at 81a and a filter disk 96 is positioned in the dished portion to prevent clogging of the passage 95 with foreign matter. The upper end of the expansible bellows 93 is urged relative to the cup shaped valve member 65 in a direction to collapse the bellows and for this purpose a spring 101 is interposed between the top wall of the cup shaped member 75 and the flange 102 on an annular spring retainer 103 carried by the disk 94 at the upper end of the bellows. As is apparent, the bellows 93 within the cup shaped member 75 defines an inner chamber C1 and an outer chamber C2. A passage 104 is preferably provided in the enlarged portion 78 on the valve stem and communicates the outer chamber C2 with the chamber C3 in the upper bellows 85. The chambers C2 and C3 are thus sealed from communication with the supply line 11 and are filled with a compressible fluid under a pressure which is low as compared to normal operating pressure in the line.

The pressure responsive valve member 65 is thus arranged to be held open when the pressure in the casing 61 is above that preselected pressure and to move downwardly to its closed position when the pressure in the casing falls appreciably below this pressure. In accordance with the present invention, a latch mechanism is provided for locking the valve member in its raised position, when the pressure in the supply line changes slowly as an incident to thermal contraction, and to lock the valve member in its closed position when the pressure in the supply line changes more rapidly as an incident to a leak in the line.

The tubular stem 76 has one or more radial holes 125 therein which receive balls 126 having a diameter greater than the radial thickness of the tubular stem. The guide sleeve 77 has upper and lower annular recesses 128 and 129 formed therein and arranged to receive the balls 126 when the valve member 65 is respectively in its raised position shown in Fig. 3 and in its lowered position shown in Fig. 5. Conveniently, the sleeve 77 may be threadedly mounted on the member 67 to permit adjustment of the sleeve and a lock nut 131 fitted onto the end of the sleeve to lock the same in its adjusted position. A locking rod 132 is attached to the disk 94 for movement therewith and is preferably threadedly connected thereto as indicated at 133 to permit adjustment of the rod relative to the disk. A reduced diameter portion 135 is formed on the rod and defines spaced upper and lower cam surfaces X and Y. As shown in Fig. 3, the reduced portion 135 is arranged so as to be laterally aligned with the radial openings 125 in the stem 76, when the bellows 93 is in its extended position. An elongated nose portion 138 is formed on the disk 94 and arranged to engage the cover 81 to limit collapsing of the bellows 93. A small rib 139 is formed on the inwardly dished portion 81a of the cover, adjacent the passage 95, to engage the nose 138 and prevent the same from blocking the passage.

At the completion of a dispensing operation, the pump is stopped and the valves at the several pedestals and the check valve 30 at the tank are closed so that the liquid in the line 11 is confined therein at substantially full pump discharge pressure, herein designated as P–1. This pressure will be maintained in the line, subject to thermal contraction and leakage from the line. While the rate of loss in volume and pressure due to thermal contraction will vary in different installations, due to various factors including the total amount and kind of liquid in the system and the rate of change of ambient temperature in that particular locality, the rate of thermal contraction is generally small as compared to the rate of loss in volume due to any significant leak. For example, in a typical gasoline service station installation, it has been determined that the rate of change in volume due to thermal contraction would be of the order of .3 cubic inch per minute while the rate of loss due to any significant leak would be several times higher.

When the pump is stopped, at the completion of a dispensing operation, the valve member 65 is in its raised position, with the stop 106 engaging the support member 67, and the expansible chamber is in its extended position with the disk 94 engaging the underside of the enlarged portion 78 on the lower end of the stem, all as shown in Fig. 3. The valve member is urged downwardly by gravity, the compression of bellows 85 and any gas pressure in the chamber C3. The valve member is urged upwardly by the pressure in the line acting on an area equivalent to area A1 and, when the line pressure decreases to a preselected value, the valve member will begin to move downwardly and carry the balls 126 downwardly relative to the stationary sleeve. For convenience, P–2 is herein used to designate the supply line pressure required to hold the valve member in that raised position in which the balls 126 are adjacent the lower edge of the recess 128 in the stationary sleeve 77.

The bellows 93 and spring 101 apply pressure to the liquid in chamber C1 and are so arranged that the pressure in chamber C1 will be maintained somewhat above the aforementioned pressure P–2, at least during that portion of the movement of bellows 93 in which the cam surface X moves from its raised position shown in Fig. 3, to a position alongside the ball openings 125 in the valve stem. P–3 is herein used to designate that pressure in chamber C1 at which bellows 93 begins to collapse and, when the supply line pressure decreases below P–3, liquid will begin to flow from chamber C1 through restricted passage 95 into the supply line. However, the valve member will not move downwardly until the line pressure drops to the somewhat lower value P–2. The rate of flow of liquid out of the chamber into the line is correlated with the rate of thermal contraction in the supply line so that, if the volume of liquid in the line decreases slowly, as occurs due to only thermal contraction, the bellows 93 will move the locking stem 132 downwardly relative to the valve member and latch the same in its raised position. On the other hand, if the volume of liquid in the line decreases rapidly, as an incident to a leak in the line, the valve member will close and be latched in its closed position.

Since the expansion chamber C1 delivers liquid to the supply line, when the supply line pressure falls below P–3, it is apparent that the supply pressure will vary as a function of the relative rates at which liquid is fed into the line from the expansion chamber C1 and is lost from the line, either by thermal contraction or leakage. The rate of flow into the line from chamber C1 is regulated by the size of the orifice 95 and the pressure maintained on the liquid in chamber C1. The valve member 65 is a pressure responsive device and detects when the average rate of loss of volume in the line substantially exceeds the average rate of inflow to the line, over a period of time, by detecting whether the line pressure is above or below a preselected pressure P–2 at the end of that time interval. If the rate of decrease in volume is not substantially greater than the rate of flow from the chamber into the line 11, the line pressure will not decrease below the pressure P–2 at which the valve member moves downwardly, in the time required for the chamber C1 to collapse from its extended position shown in Fig. 3, to a position in which the cam surface X moves alongside the balls 126. Under these conditions, the locking stem 132 will cam the balls 126 into the recess 128 and latch the valve member in its raised position shown in Fig. 4. However, if the rate of decrease in volume in the line greatly exceeds the rate of flow from the chamber C1 into the line, the pressure in the line will decrease rapidly to a value below P–2. The valve 65 will then move downwardly and move the locking balls 126 below the recess 128 before the bellows 93 can collapse sufficiently to move the cam surface X past the ball openings 125 in the stem. As the stem moves downwardly, the balls 126 are cammed into the groove 135 in the locking stem so that the valve member 65, the valve stem 76 and the locking stem 132 move downwardly together until the valve member reaches its lower seated position shown in Fig. 5. As the expansible chamber C1 collapses further, it moves the locking stem relative to the valve stem so that the cam surface X on the locking stem forces the balls 126 into the lower recess 129 to lock the valve member in its lower position.

When the pump 13 is operated after the valve member 65 has been latched in its closed position, the valve member will move away from its seat only a short distance until the balls 126 engage the shoulder at the upper edge of the lower recess 129. This is adjusted so that only a restricted flow of gasoline can pass the valve member and at a rate insufficient to permit normal dispensing of gasoline. The fluid under pressure will also flow through the restricted passage 95 and gradually expand the bellows 93. After a time interval, the bellows is expanded sufficiently to move the reduced portion 135 on the locking rod into registry with the balls 126 so as to thereby release the valve member and permit the same to move upwardly in response to the fluid pressure unbalance thereon.

The device thus detects a leak by detecting when the rate of change of volume and pressure exceeds a preselected "minimum" rate corresponding to the maximum rate of thermal contraction in that particular installation. The device can be adjusted for a higher or lower "minimum" rate, for different installations, by varying the size of the flow passage 95 and hence the rate of flow of liquid out of the chamber C1. However, the device can also be adjusted for a different "minimum" rate, by moving the locking sleeve 77 downwardly or upwardly. If the sleeve 77 is moved downwardly, the pressure P–2 at which the valve member moves the balls 126 below the recess 128, is effectively lowered. In addition, the valve member 65 displaces some liquid as it moves downwardly, and this displaced liquid compensates in part for the liquid lost from the line due to thermal contraction or leakage. Consequently, moving the sleeve 77 downwardly will increase the "minimum" rate and conversely moving the sleeve upwardly will decrease the "minimum" rate of the device. Since the sleeve 77 can be adjusted in small increments after installation in the line, it provides a convenient arrangement for making final adjustments in the device for that particular installation.

I claim:

1. An automatic apparatus for detecting a leak in a line between an intermittently operated pump and a remote outlet comprising a casing having an inlet and an outlet and a port between said inlet and outlet, a valve member cooperable with said port and adapted to open when the pump is operated to pass liquid from said inlet to said outlet, a chamber communicating with said line for receiving liquid therefrom when said pump is operated and for delivering liquid to said line when the pump is stopped, means including said chamber for detecting the rate of decrease in pressure in the line after the pump is stopped, and locking means operated by said detecting means when the rate of decrease in pressure in the line exceeds a preselected rate indicative of a leak from the line for preventing said valve member from moving to a fully open position.

2. A device for detecting leaks in a line between an intermittently operated pump and a remote outlet comprising a casing having an inlet and an outlet and a port between said inlet and outlet, a pressure responsive valve means removable from a closed position to an open position when the pressure in said casing is above a preselected pressure, an expansible chamber communicating with said casing to receive liquid therefrom when the pump is operated, means for maintaining the liquid in the chamber under a pressure exceeding said preselected pressure to force the liquid out of the chamber into the line when the pump is stopped, means for restricting the flow of liquid out of said chamber to a relatively low rate sufficient to maintain said preselected pressure in the casing over a time interval when the volume of the liquid in the line decreases at a slow rate as an incident to thermal contraction and insufficient to maintain the preselected pressure over that time interval when the volume of the liquid in the line decreases at a more rapid rate as occurs when liquid leaks from the line, and means controlled by said expansible chamber and operative at the end of said time interval for locking said valve means in its open position when the volume of liquid in the line decreases at said slow rate.

3. A device for detecting leaks in a line between an intermittently operated pump and a remote outlet comprising a casing having an inlet and an outlet and a port between said inlet and outlet, a pressure responsive valve means removable from a closed position to an open position when the pressure in said casing is above a preselected pressure, an expansible chamber communicating with said casing to receive liquid therefrom when the pump is operated, means for maintaining the liquid in the chamber under a pressure exceeding said preselected pressure to force the liquid out of the chamber into the line when the pump is stopped, means for restricting the flow of liquid out of said chamber to a relatively low rate sufficient to maintain said preselected pressure in the casing over a time interval when the volume of the liquid in the line decreases at a slow rate as an incident to thermal contraction and insufficient to maintain the preselected pressure over that time interval when the volume of the liquid in the line decreases at a more rapid rate as occurs when liquid leaks from the line, and means controlled by said expansible chamber and operative at the end of said time interval to lock said valve means in its open position when the volume of liquid decreases at said slow rate and to lock said valve means in its closed position when the volume of liquid decreases at said more rapid rate.

4. A device for detecting leaks in a line between an intermittently operated pump and a remote outlet comprising a casing having an inlet and an outlet and a port between said inlet and outlet, a valve member for controlling flow through said port, means for detecting the rate of decrease in pressure in the line when the pump is stopped, and means actuated by said detecting means and operative when the pressure drops in the line at a slow rate incident to thermal contraction in the line for locking said valve member in its open position and operative when the pressure drops in the line at a relatively rapid rate incident to leaking of fluid from the line for locking said valve member in its closed position.

5. A device for detecting leaks in a line between an intermittently operated pump and a remote outlet comprising a casing having an inlet and an outlet and a port intermediate said inlet and outlet, a valve member for controlling flow through said port, means mounting said valve member for movement from a closed position to an open position in response to the application of a preselected pressure thereto, an expansible chamber carried by said member for movement therewith and communicating with said casing to receive a charge of liquid therefrom when the pump is operated, means for applying pressure on said chamber to collapse the same and urge the liquid outwardly therefrom, means for restricting the rate of flow of liquid from said chamber to a relatively low rate sufficient to maintain said preselected pressure in said casing over a time interval when the volume of liquid in the casing decreases at a slow rate incident to thermal contraction and insufficient to maintain the preselected pressure in the casing over that time interval when the volume of liquid in the casing decreases at a more rapid rate incident to the leakage of liquid from the line, and means responsive to collapsing of said chamber for latching said valve member in its open or closed position selectively in accordance with the position of the valve member at the time said chamber is collapsed.

6. The combination of claim 5 wherein said pressure applying means includes a spring interposed between said expansible chamber and said valve member.

7. A device for detecting leaks in a line between an intermittently operated pump and a remote outlet comprising a casing having an inlet and an outlet and a port intermediate said inlet and outlet, a valve member for controlling flow through said port, means mounting said valve member for movement from a closed position to an open position in response to the application of a preselected pressure thereto, an expansible chamber carried by said member for movement therewith and communicating with said casing to receive a charge of liquid therefrom when the pump is operated, means for applying pressure on said chamber to collapse the same and urge the liquid outwardly therefrom, means for restricting the rate of flow of liquid from said chamber to a relatively low rate sufficient to maintain said preselected pressure in said casing over a time interval when the volume of liquid in the casing decreases at a slow rate incident to thermal contraction and insufficient to maintain the preselected pressure in the casing over that time interval when the volume of liquid in the casing decreases at a more rapid rate incident to the leakage of liquid from the line, said casing having a guide sleeve thereon, a stem on said valve member disposed in said sleeve, latch means on said sleeve and guide operative when the valve member is open to latch the same in its open position and operative when the valve member is closed to latch the same in its closed position, and a latch rod on said expansible chamber operative upon collapse of said chamber to operate said latch means.

8. A device for detecting a leak in a line between an intermittently operated pump and a remote outlet comprising a casing having an inlet and an outlet and a port intermediate said inlet and outlet, a valve member for controlling flow through said port, pressure responsive means operative when the pressure in said casing exceeds a preselected pressure for opening said valve member and for maintaining the same in its open position, and means for controlling the pressure in said casing, said last mentioned means including a chamber communicating with said casing to receive liquid therefrom when the pump is operated and to deliver liquid thereto when the pump is stopped, means for maintaining the liquid in the chamber under pressure above said preselected pressure to force the liquid out of the chamber and into the line, and means for restricting the rate of flow of liquid from the chamber to the casing to a rate sufficient to maintain said preselected pressure therein over a time interval when the volume of liquid in the line changes slowly as an incident to thermal contraction and insufficient to maintain said preselected pressure over that time interval when the volume of liquid in the line changes rapidly as an incident to leakage from the line.

9. The combination of claim 8 wherein the chamber is disposed within and carried by the valve member.

10. The combination of claim 8 including means operative in response to the passage of liquid from said chamber while said preselected pressure is maintained in the casing for latching said valve member in its open position.

11. A device for detecting leaks comprising a casing having an inlet and an outlet and a port intermediate said inlet and outlet, a valve member including a hollow body having a valve stem thereon slidably supported on said casing, one end of said body being cooperable with said port to control flow therethrough, an expansible chamber disposed within said valve body and having a latch member thereon mounted on said valve member for movement relative thereto, said body having a port therein for passing a restricted flow of fluid to and from said chamber, means interposed between said expansible chamber and said body yieldably urging the chamber to a collapsed position to maintain the fluid in the chamber under pressure, and locking means interposed between said stem and said casing and operative in response to movement of said latch member relative to said valve member for latching the latter in a closed position when liquid leaks from the casing.

12. A device for detecting leaks comprising a casing having an inlet and an outlet and a port intermediate said inlet and outlet, a valve member including a hollow body having a stem thereon slidably supported on said casing, an expansible chamber disposed within said body and having a latch rod thereon slidably supported in said stem, means interposed between the body and the expansible chamber for yieldably urging the latter towards its collapsed position, passage means in the body for passing a restricted flow of liquid into and out of said chamber, and latch means interposed between said stem and casing and operative in response to movement of said latch rod relative thereto for latching said member in an open or closed position selectively in accordance with the rate of pressure drop in said casing.

13. A device for detecting leaks comprising a casing having an inlet and an outlet and a port intermediate said inlet and outlet, a hollow valve body, means including a first bellows sealed to said body and to said casing for mounting the body for movement between a closed position and an open position in response to the application of a preselected fluid pressure on the body, a second bellows disposed within said body and having one end sealed thereto, said body having a port therein communicating with said second bellows to permit a restricted flow of fluid into and out of said second bellows, spring means interposed between said second bellows and said body for yieldably urging said second bellows to a collapsed position, and latch means operative in response to movement of said second bellows relative to said body for latching said valve body in an open or closed position selectively in accordance with the rate of pressure drop in said casing.

14. The combination of claim 13 including passage means communicating said first bellows with said hollow body external of said second bellows.

15. The combination of claim 13 wherein said valve body has a stem thereon slidably supported in said casing, said latch means being interposed between said stem and said casing.

References Cited in the file of this patent
UNITED STATES PATENTS

| | | |
|---|---|---|
| 1,940,346 | Edwards | Dec. 19, 1933 |
| 2,428,150 | Field | Sept. 30, 1947 |
| 2,641,277 | Booth | June 9, 1953 |
| 2,872,806 | Mamzic | Feb. 10, 1959 |